March 8, 1949.  A. W. STORM  2,463,652

VACUUM TUBE MEASURING INSTRUMENT

Filed Sept. 18, 1944

Inventor
ANDRE WILLEM STORM,
Attorney

Patented Mar. 8, 1949

2,463,652

UNITED STATES PATENT OFFICE 2,463,652

VACUUM TUBE MEASURING INSTRUMENT

André Willem Storm, Sydney, New South Wales, Australia, assignor to Hartford National Bank & Trust Company, Hartford, Conn., as trustee Application September 18, 1944, Serial No. 554,698
In Australia September 27, 1943

2 Claims. (Cl. 171—95)

1

The sensitivity of vacuum tube bridges and vacuum tube voltmeters largely depends upon the sensitivity of the indicating meter and also upon the slope of the grid voltage anode current characteristic curve of the tubes used in the instrument. Consequently it is desirable to use a sensitive microammeter as the indicating device and tubes capable of passing relatively large currents in the instrument itself.

While such a combination gives great sensitivity, care has to be taken in its use because when a vacuum tube bridge is in an unbalanced condition excessive current will flow through the meter and may damage it.

The primary object of this invention is to provide simple means for protecting the meter from damage when the bridge is unbalanced without in any way materially decreasing the sensitivity of the bridge.

Another object of the invention is to protect the meter of a vacuum tube voltmeter from damage arising from the flow of excessive current.

As applied to vacuum tube bridges, the invention consists in using pentode or tetrode tubes in the bridge circuit and including in the anode circuit of each tube a high resistance. These high resistances are of such a value that the potential reaching the anode of the tube when the bridge is near its balanced condition is sufficiently high for the tube to function in its normal manner. When the bridge is unbalanced however, the voltage drop across the resistance causes the anode potential to fall very rapidly and thus limits the current which can flow through the meter.

For example, in a particular bridge circuit making use of the invention the anode impedance of the pentode tubes is of the order of 1,000,000 ohms and the series resistances are given values of 100,000 ohms. The source of supply is of the order of 200 volts and in the balanced condition the anode current of the tubes is of the order of 1 milliampere. Under these conditions, the anode potential will be approximately 100 volts when the bridge is balanced. When the bridge is unbalanced the current will be limited to less than 2 milliamperes because of the loss in the resistances thus protecting the meter. The sensitivity of the bridge near the balanced condition is practically unaffected because the added resistance of 100,000 ohms is small in comparison with the internal resistance of the tubes (1,000,000 ohms) and the anode current in the pentode tubes is practically independent of the anode potential for voltages of the order of 100 volts.

2

In the accompanying drawings which illustrate the invention.

Figure 1:
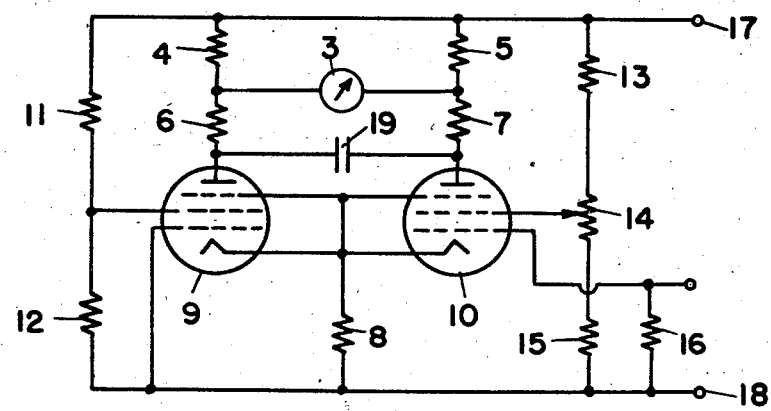
Figure 1 depicts the circuit connections of a bridge which utilises pentode tubes of the type known commercially as 6J7.

In Figure 1, the meter is indicated by the numeral 3, while 4 and 5 herein known as load resistor elements denote the resistive arms of the bridge, being given values of 3,000 ohms (selected to give linear operation). Resistances 6 and 7 herein called current limiting resistors of the order of 30,000 ohms are introduced into the anode circuits of the pentode tubes 9 and 10, in accordance with this invention. The circuit through the tubes is completed by the cathode resistance 8 of 400 ohms. The screen of tube 9 is fed by the resistance network 11 and 12 the ratio of these resistances being such as to apply approximately 100 volts to the screen. The screen of tube 10, is fed by the resistance network 13, 14 and 15, the resistor 14 being used as a potentiometer so that the screen potential can be adjusted to balance the bridge. The control grid of tube 9 is directly connected to the negative terminal of the supply voltage, while the control grid of tube 10 is connected to the negative terminal of the supply by the resistor 16 across which is applied or generated the potentials it is desired to measure. The supply voltage is applied between the positive terminal 17 and the negative terminal 18 and should be of the order of 300 volts. A condenser 19 of large capacity is connected between the anodes of the two tubes to protect the meter from sudden changes in current by forming a circuit of large time constant in combination with the resistors 6 and 7.

In such a circuit the current through the anode circuits of the tubes is normally of the order of 4 milliamperes thus producing a potential between the anodes of the tubes and the negative terminal of the supply of approximately 170 volts. If, however, a large positive potential is applied to the control grid of tube 10 by the production of a difference of potential across resistor 16 the current through tube 10 would, in the absence of current limiting resistor 7, tend to increase to the maximum which the tube can pass, which is, for a 6J7 tube, of the order of 20 to 30 milliamperes. The characteristic curves of the 6J7 tube show that, with a screen voltage of 100 volts, when the anode potential falls below 40 volts the anode current rapidly decreases. Because of the voltage drop through resistance 7 due to the increase in anode current, the anode potential falls below the said 40 volt value and thus the resistance 7 limits the current through the tube to approximately 8 milliamperes and thus protects the meter. On the other hand the characteristic curves for the 6J7 tube show that for currents of the order of 4 milliamperes at which the anode potential will be approximately 170 volts, the slope of the grid voltage-anode current characteristic is not materially affected by the presence of the resistance 7.

Figure 2:
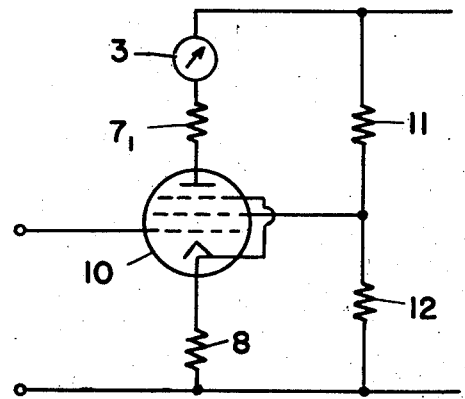
Figure 2 depicts the circuit connections of a vacuum tube voltmeter utilising a tube of the same type.

The invention may be applied to a single tube having a meter included in its anode circuit. Thus Figure 2 represents a simple vacuum tube voltmeter in which a pentode tube is used and in which the resistance 7₁ protects the meter from excessive currents without materially interfering with the sensitivity of the voltmeter for small potential changes.

It will be apparent that the invention can similarly be applied to vacuum tube bridges and voltmeters intended for use with alternating potentials as the tubes may be arranged to function as rectifiers, or, alternatively, applied in conjunction with an alternating current indicator by well known circuit arrangements.

Having now described my invention what I claim as new and desire to secure by Letters Patent is:

1. A vacuum tube voltage measuring device comprising two discharge tubes each having a cathode, an anode, a control grid interposed between the cathode and anode and a screen grid interposed between the control grid and the anode, a supply line for applying operating potentials to said tubes, a resistor element interconnecting the cathodes and the low potential end of the supply line, the control grid of one of said tubes being connected to the low potential end of the supply line, means to apply the voltage to be measured to the control grid of the other of said tubes to thereby vary the potential of the control grid thereof, two resistor elements connected in series across said supply line and having their junction connected to the screen grid of one of said tubes, a resistor element connected across said supply line and having a tapping thereof connected to the screen grid of the other of said tubes, a load resistor element and a current limiting resistor element connected in series relationship between the high potential end of the supply line and the anode of one of said tubes, a load resistor element and a current limiting resistor element connected in series relationship between the high potential end of the supply line and the anode of the other of said tubes, said limiting resistor elements having a value at which variations of the control grid potentials of said tubes within the normal operating range of said control grid potentials produce anode potentials at which the anode currents of the tubes are substantially proportional to the control grid potentials and independent of the anode potentials and at which variations of the control grid potentials beyond the said normal operating range decrease the anode potentials to a value at which the anode currents of the tubes are proportional to the control grid potentials and proportional to the anode potentials, and a meter element interconnecting the junction points of said load resistor and said limiting resistor elements.

2. A vacuum tube voltage measuring device comprising two discharge tubes each having a cathode, an anode, a control grid interposed between the cathode and anode and a screen grid interposed between the control grid and the anode, a supply line for applying operating potentials to said tubes, a resistor element interposed between the low potential end of the supply line and the cathodes of said tubes, two resistor elements connected in series across the supply line, the control grid of one of said tubes being connected to the low potential end of the supply line and the screen grid thereof being connected to the junction of said series connected resistor elements, a resistor element connected across said supply line and having a variable tapping connected to the screen grid of the other of said tubes, means to apply the voltage to be measured to the control grid of the said other tube to thereby vary the potential of the control grid thereof, a load resistor element and a current limiting resistor element connected in series relationship between the high potential end of the supply line and the anode of one of said tubes, a load resistor element and a current limiting resistor element connected in series relationship between the high potential end of the supply line and the anode of the other of said tubes, said limiting resistor elements having a value at which variations of the control grid potentials of said tubes within the normal operating range of said control grid potentials produce anode potentials at which the anode currents of the tubes are substantially proportional to the control grid potentials and independent of the anode potentials and at which variations of the control grid potentials beyond the said normal operating range, decrease the anode potentials to a value at which the anode currents of the tubes are proportional to the control grid potentials and proportional to the anode potentials, a meter element interconnecting the junction points of said load resistor and limiting resistor elements, and a capacitor element interconnecting the anodes.

ANDRÉ WILLEM STORM.

REFERENCES CITED

The following references are of record in the file of this patent:

UNITED STATES PATENTS

| Number | Name | Date |
|---|---|---|
| 1,755,244 | Dietze | Apr. 22, 1930 |
| 2,067,489 | Howey et al. | Jan. 12, 1937 |
| 2,208,254 | Geohegan | July 16, 1940 |
| 2,270,243 | Bach | Jan. 20, 1942 |
| 2,273,987 | Pineo | Feb. 24, 1942 |
| 2,311,807 | Anderson | Feb. 23, 1943 |
| 2,316,044 | Blair | Apr. 6, 1943 |

FOREIGN PATENTS

| Number | Country | Date |
|---|---|---|
| 526,869 | Great Britain | Sept. 26, 1940 |

OTHER REFERENCES

"Vacuum Tube Voltmeters," by J. F. Rider (1941), (pages 67 and 105).